United States Patent [19]

Leo

[11] 4,328,684
[45] May 11, 1982

[54] SCREW COMPRESSOR-EXPANDER CRYOGENIC SYSTEM WITH MAGNETIC COUPLING

[75] Inventor: Bruno S. Leo, Santa Monica, Calif.

[73] Assignee: Hughes Aircraft Company, Culver City, Calif.

[21] Appl. No.: 102,220

[22] Filed: Dec. .J, 1979

Related U.S. Application Data

[63] Continuation-in-part of Ser. No. 894,677, Apr. 10, 1978, abandoned.

[51] Int. Cl.³ ............................................. F25D 9/00
[52] U.S. Cl. .................................. 62/402; 310/104; 417/420; 418/200
[58] Field of Search ................. 62/505, 402, 6; 418/9, 418/69, 86, 200, 201; 310/104; 417/420

[56] References Cited

U.S. PATENT DOCUMENTS

| | | | |
|---|---|---|---|
| 3,405,604 | 10/1968 | Lysolm | 418/86 |
| 3,751,673 | 8/1973 | Sprankle | 418/201 |
| 3,795,117 | 3/1974 | Moody, Jr. et al. | 62/505 |
| 3,902,827 | 9/1975 | Schibbye | 418/201 |
| 3,910,731 | 10/1975 | Person et al. | 418/201 |
| 3,956,904 | 5/1976 | Edwards | 62/402 |
| 4,044,567 | 8/1977 | Dix et al. | 62/6 |

FOREIGN PATENT DOCUMENTS

609405  1/1935  Fed. Rep. of Germany .

Primary Examiner—Ronald C. Capossela
Attorney, Agent, or Firm—Allen A. Dicke, Jr.; W. H. MacAllister

[57] ABSTRACT

Cryogenic refrigeration system 10 employs a screw compressor 72 and a screw expander 70 wherein one rotor of the compressor and one rotor of the expander is mechanically driven, including a magnetic coupling 50, 52 between the compressor and expander rotors. The other compressor rotor and other expander rotor is driven only by the connected rotor.

17 Claims, 7 Drawing Figures

SCREW COMPRESSOR-EXPANDER CRYOGENIC SYSTEM WITH MAGNETIC COUPLING

CROSS-REFERENCE TO RELATED APPLICATIONS

This application is a continuation in part of patent application Ser. No. 894,677 filed Apr. 10, 1978 by Bruno S. Leo for "Screw Compressor-Expander Cryogenic System", the entire disclosure which is incorporated herein by this reference. That application was abandoned and a continuation thereof was filed on June 12, 1980. The continuation application received Ser. No. 158,764 and is now U.S. Pat. No. 4,291,547 issued Sept. 29, 1981.

BACKGROUND OF THE INVENTION

This invention is directed to a cryogenic system where both the compressor and expander, which operate with the cryogenic refrigerant fluid in the system, are rotary screw-type machinery of the Lysholm type with the expander being coupled to the drive system with a magnetic coupling operating through a wall to separate the compressor and expander chambers.

Lysholm built an early prototype of the rotary screw compressor in 1934. Some of his development work was described in the *Proceedings of the Institution of Mechanical Engineers*, Vol. 150, No. 1, Pages 11–16 and 4 plates 1943. One of the main features of this screw compressor is the fact that it can run without oil or other lubricant in the compression chamber. No oil is necessary because the rotors do not contact each other or the casing. The only mechanical contact is in the bearings and in the timing gears (if any) which can be located on the outside of the gas containing casing and away from the refrigerant gas flow stream.

The Lysholm type rotary screw compressor has two rotors with intermeshing lobes. Within the intermesh of the lobes and housing, the compression takes place. Two helical rotors comprise the working parts of the screw compressor. The male rotor generally has four lobes and rotates 50 percent faster than the female rotor which has six flutes between which are grooves in which the lobes interengage. Other ratios of lobes to flutes are also used. The gas is compressed in the spaces between the housing, the lobes and the grooves. The lobes and the grooves are helical so that the space appears to move progressively toward the outlet end of the housing, and the space becomes progressively smaller along the length of the rotors as the rotors rotate. Thus, gas taken in the inlet port at the suction end is compressed in the space as the rotors turn and the gas is delivered at higher pressure from the outlet port at the delivery end of the housing. The inlet and outlet ports are automatically covered and uncovered by the shaped ends of the rotors as they turn.

There has been considerable development work done on the improvement of such screw compressors. Most of the patents are owned by Svenska Rotor Maskiner which devoted the pioneer effort in this art and appears to hold most of the patents. The company is located in Nacka, Sweden.

Nilsson, U.S. Pat. No. 3,245,612 and Schibbye, U.S. Pat. Nos. 3,283,996 and 3,423,017 are particularly directed to the shapes of the lands and the grooves in the rotors, but show the porting and general organization of the rotary screw compressor to show how compression and expansion are achieved in such a structure. Furthermore, this type of screw compressor is illustrated as being the compressor in refrigerator systems in U.S. Pat. Nos. 3,432,089; 3,811,291; 3,848,422 and 3,945,216.

While the use of screw compressors has been recognized for refrigerator compressor service, the use of such devices as expanders for such service has not been recognized. Furthermore, it has not been previously recognized that screw compressors and expanders in the same refrigerator can efficiently run at about the same speed so that they can be coupled directly or through gearing, for speed control of the expander and for power feedback from the expander. In the refrigeration arts, it is known that with source gases and conditions it is necessary to extract work during expansion to produce refrigeration, with some refrigerant gases within some of their operating temperature ranges. In the past, piston expanders have been used, usually in smaller refrigerators, and turbo expanders have been used, usually in large refrigerators. While the work output of such expanders is not significant in terms of total refrigeration input power, speed control of the expander is necessary. Such speed control has been difficult where the turbo expander runs at very high speed. It is part of this invention that the employment of an expander coupled to and running with the compressor is feasible when screw-type equipment is used for refrigerant gas compression and expansion.

In order to supply economical refrigeration a design of minimum complexity, associated with long and trouble free life, is necessary. The structure of this invention provides a refrigerator which is of low weight per unit of refrigeration, and is especially designed so that in the small sizes for which this refrigeration system is most suitable, the structure is of simplified mechanical design. Thus, such a refrigeration system can be used to cool devices for long maintenance free life and can be employed in locations where total weight and input power should be minimized.

SUMMARY OF THE INVENTION

In order to aid in the understanding of this invention, it can be stated in essentially summary form that it is directed to a screw compressor-expander cryogenic refrigerator system wherein a wall is positioned between the compressor and expander housings, with magnetic drive through the wall to eliminate flow of gas between the chambers. Furthermore, the rotors of both the compressor and expander are designed so that they can operate without timing gears.

In addition, valving can be provided to employ the regenerator system instead of a counterflow heat exchanger system in the screw compressor-expander cryogenic system of this invention, and the regenerator system as illustrated in connection with a two expander stage machine.

It is thus an object of this invention to provide a screw compressor-expander cryogenic system wherein Lysholm-type gas handling equipment is used for compression and expansion of the gas to produce refrigeration. It is another object of this invention to provide a refrigerator wherein a long trouble-free life is achieved. It is a further object to provide a screw compressor-expander cryogenic refrigerator system wherein the expander runs at the same relative rotative rate as the compressor to permit coupling between the expander and compressor for speed control of the expander and feedback of work from the expander to the compressor.

It is another object to provide a screw compressor-expander cryogenic refrigerator system wherein a wall is provided between the compressor chamber and the expander chamber and magnetic coupling provides the rotary mechanical coupling between the rotors in the two chambers to prevent gas leakage through the rotor bearings. It is a further object to provide a screw compressor-expander cryogenic refrigerator system wherein the two rotors in the compressor chamber are coupled together through a hydrodynamic gas film so that the driven rotor rotates without mechanical contact against the driving rotor, and in the expander chamber, the rotors are not geared together but are separated by hydrodynamic gas action to reduce wear on the running parts of the refrigerator system and this maintain a long life.

It is another object to provide a screw compressor-expander cryogenic refrigerator system wherein the employment of a screw-type compressor and a screw-type expander permits the production of refrigeration at an increased value of unit of refrigeration per unit of weight so that the system can be employed in locations where weight is critical. It is a further object to provide a cryogenic refrigerator system which employs a screw-type compressor and a screw-type expander wherein more refrigeration is produced per unit of input power to permit use of the refrigerator system in locations where power must be conserved.

It is a further object to provide a screw expander-compressor refrigeration system wherein a multiple stage expander is employed to increase system efficiency and provide two temperature levels of refrigeration. It is another object to provide a screw compressor-expander cryogenic refrigerator system wherein valving is driven by the rotors of the compressor-expander equipment and the valving controls gas flow through regenerators for exchanging heat between flow streams.

Other objects and advantages of the this invention will become apparent from a study of the following portion of the specification, the claims and the attached drawings.

DESCRIPTION OF THE PREFERRED EMBODIMENT

Figure 1:
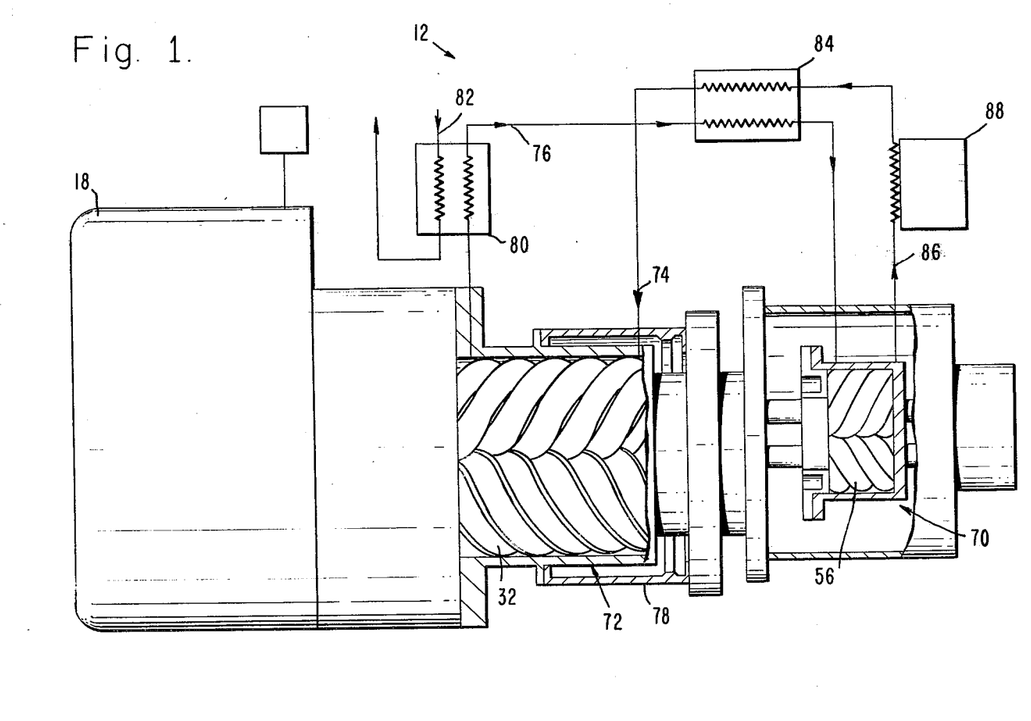
FIG. 1 is a side elevational view of the screw compression-expander cryogenic system of this invention with parts broken away and parts taken in section to show the cryogenic gas flow path through the compression and the expansion chambers and through the heat exchangers.
Figure 2:
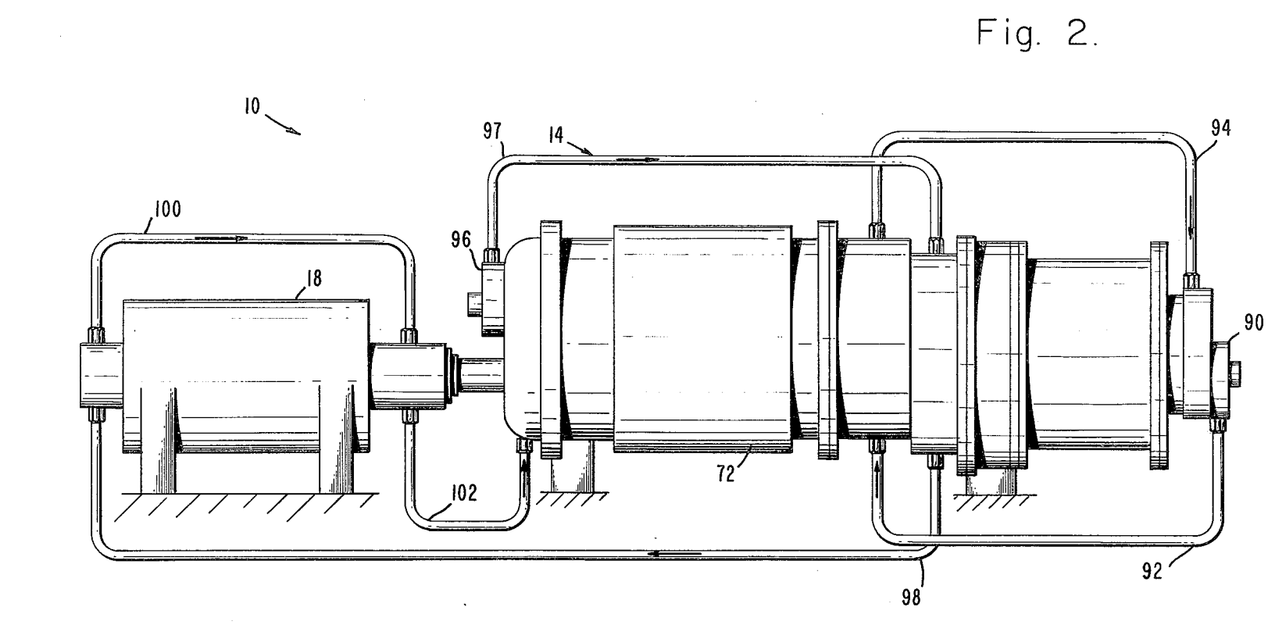
FIG. 2 is a side elevational view of a similar screw compressor-expander cryogenic system showing the machinery as interconnected by a lubrication system.
Figure 3:
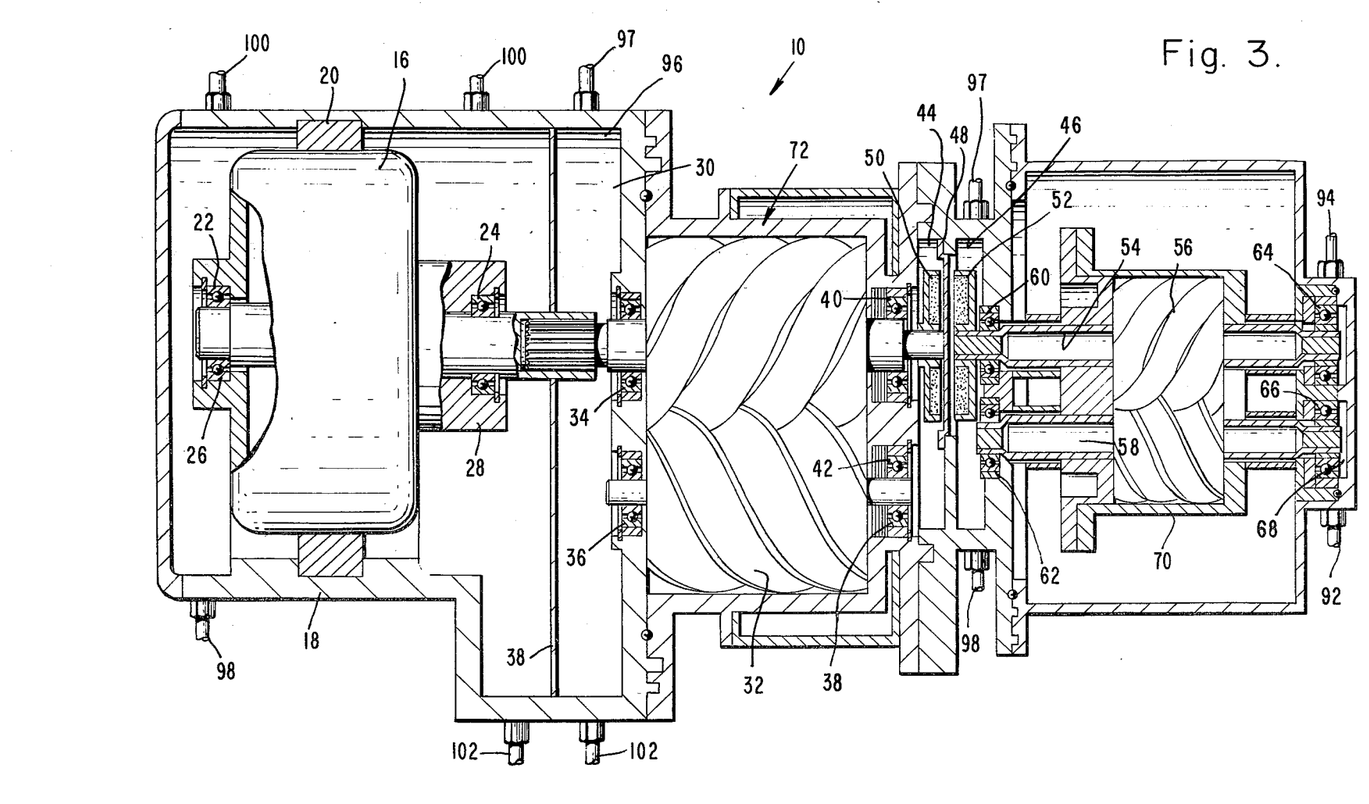
FIG. 3 is a longitudinal section taken through the center line of a screw compressor-expander cryogenic system showing the details of the compression and the expansion chambers, the magnetic coupling transmitting power and speed control between the compressor and the expander rotors and the lubrication of the various bearings.

The mechanical equipment 10 of the screw compressor-expander cryogenic system is generally indicated in FIGS. 1, 2 and 3. In FIG. 1 it is shown in association with the external gas flow equipment 12 which completes the cryogenic system and in FIG. 2 it is shown in association with the lubrication plumbing 14 which is external to the machinery 10. The machinery 10 comprises drive motor 16 which is usually an electric motor and is positioned within motor housing 18. Motor housing 18 is divided by wall 20 so that the motor bearings 22 and 24 in bearing bosses 26 and 28 are in separate lubrication compartments.

End wall 30 serves as the end wall for compressor chamber 32 as well as mounting boss for the compressor drive end bearings 34 and 36. Wall 38 through motor housing 18 separates the compressor drive end bearings 34 and 36 from motor drive end bearing 24 to provide separate compartments for these bearings.

The other end of compressor chamber 32 is closed by end wall 38 which carries back end compressor bearings 40 and 42. Magnetic coupling compartment 44 is separated from magnetic coupling compartment 46 by thin magnetic wall 48. Magnetic coupling disc 50 is mounted on the end of the compressor shaft to rotate therewith.

As it is seen in FIG. 3, the compressor shaft is coupled to the motor shaft so that the whole structure is driven by the motor. Magnetic coupling disc 52 faces disc 50 from compartment 46 so that magnetic coupling between the discs takes place through wall 48. Each of the discs is a multiple magnet arranged so that the magnets can couple together to transmit torque. Disc 52 is mounted on expander shaft 54 which extends out of expander compartment 56 on low thermal loss hollow shafts. The companion expander shaft 58 carries the mating expander rotor. The expander shafts are carried on bearings 60 and 62 in compartment 48 while the bearings 64 and 66 carry the other ends of the expander shafts in compartment 68. Each of the bearings is provided with a seal between the bearing and the adjacent compressor or expander chamber.

The rotors are designed such that the gas dynamics in the space between the rotors holds them apart so that no timing gears are necessary to prevent mechanical contact between the rotors. By appropriate rotor design, an expander 70 expanding air from one atmosphere to 0.5 atmosphere while running at 10,000 rpm can operate without contact. In a test of that nature, the rotors were inspected after a one hour test and showed no contact or wear.

As seen in FIG. 1, compressor 72 receives refrigerant gas at its right end through suction line 74 and compresses it within chamber 32 to deliver it in pressure line 76. As indicated above, suitable pressures are respectively 0.5 atmosphere in the suction line 74 and one atmosphere in the pressure line 76. Suitable refrigerant gases depend on the desired temperature, but include nitrogen, argon, carbon dioxide, neon, helium and hydrogen. The gas selected and the line pressures depend on the desired end temperature. Jacket 78 carries a coolant which carries off some of the heat of compression while after cooler 80 brings the refrigerant fluid in the pressure line 76 almost down to the temperature of the coolant in coolant line 82. Counterflow heat exchanger 84 further cools the gas flowing in pressure line 76. From heat exchanger 84, the gas in pressure line 76 goes into the expander chamber 56 at the left end which is the high pressure end of expander 70. Rotation of the rotors in the expander chamber expand the gas into cold line 86 which is at the pressure of suction line 74. Heat load 88 adds heat to the gas while the heat load 88 is cooled. From the heat load 88 the gas passes through counter flow heat exchanger 84 and back to the suction line 74 of compressor 72. The refrigeration cycle is discussed in more detail in patent application Ser. No. 894,677, filed Apr. 10, 1978, the entire disclosure which is incorporated herein by this reference. That application was abandoned and a continuation thereof was filed on June 12, 1980. The continuation application received Ser. No. 158,764 and is now U.S. Pat. No. 4,291,547 issued Sept. 29, 1981.

One of the specific improvements is the fact that there is a wall 48 between the compressor and expander, with power transferred between the compressor and expander through the magnetic coupling. Because of the partition wall and the magnetic coupling there is no flow of gas between the compressor housing and the expander housing and thus the pressure in the adjacent bearing compartment is equal to the adjacent gas pressure in the chamber in the housing. In other words, there is no pressure drop which would drive lubricant from the bearing into the compressor or expander chamber or which would drive refrigerant gas into the bearings to drive lubricant out of the bearings.

In order to aid in bearing lubrication oil mist lubrication is provided. Radial blower 90, see FIG. 2 draws gas from compartment 68 together with the oil suspended in the gas and discharges it out line 92 where it is passed to compartment 44, see FIG. 3. From the top of compartment 44, line 94, carries the oil mist suspended in refrigerant gas back through compartment 68 to blower 90. When there is an oil mist of 1 to 5% per volume of bearing lubrication oil to refrigerant gas, the blower 90 maintains the oil in mist suspension as it passes through the lines and bearing compartments so that the bearings are continuously lubricated. The bearings 40, 42, 64 and 66 are lubricated by this circuit. From FIG. 1, it can be seen that the ends of the corresponding compressor and expander chambers adjacent these bearings are at the same pressure, the pressure of low pressure line 74 so that there is no pressure drop between the bearing compartment and the chambers so that the oil is not driven one way or another.

Lubricant blower 96 is driven by the idler rotor in compressor 72. It draws refrigerant gas and suspended oil mist from the compartment of bearings 34 and 36 and delivers it through line 97 to compartment 46 where it serves to lubricate bearings 60 and 62. From that compartment, the mist is conveyed through line 98 to lubricate the bearing 22 and thence through line 100 to lubricate the other motor bearing 24. From thence, line 102 conveys the mist back to the compartment adjacent bearings 34 and 36 from whence it is drawn back into the blower 96 to continue its continuous closed cycle. The continuous closed cycle from blower 96 distributes lubricant through bearing compartments which are the same pressure as the adjacent gas of in this case 1 atmosphere so there is no differential pressure across the bearings from adjacent compartments. This reduces load on the bearing seals.

Figure 4:
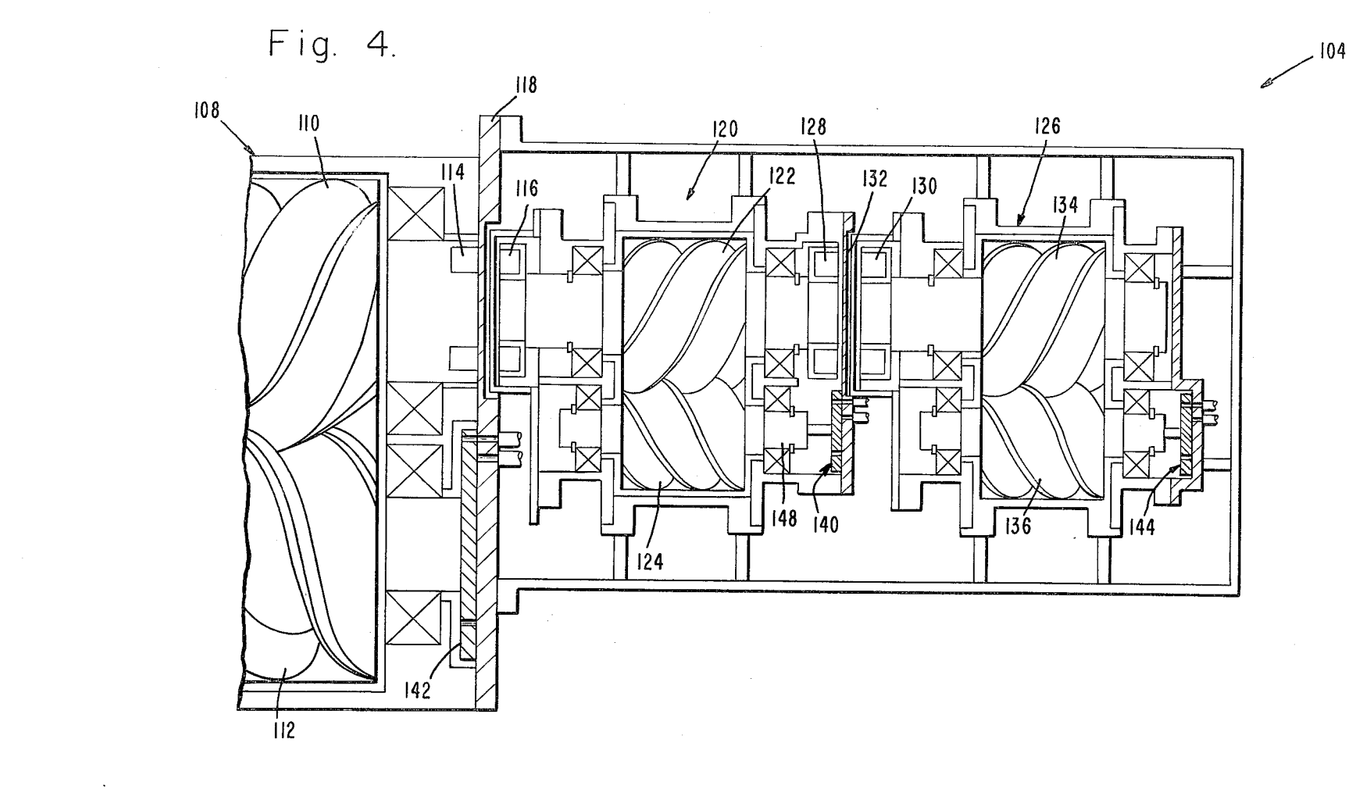
FIG. 4 is a longitudinal section through another preferred embodiment of the screw compressor-expander cryogenic system of this invention with magnetic coupling between the stages, with multiple expander stages and with valving for reversing flow in external passages so that it can be used in conjunction with heat exchange regenerators.

Another preferred embodiment of the screw compressor-expander cryogenic system of this invention is generally indicated at 104 in FIG. 4. It comprises a motor 106 which drives compressor 108 which has rotors 110 and 112 of the type previously described. The rotor 110 is driven directly by motor 106 and rotor 112 is preferably driven by gas film between the lobes and recesses on the rotors so that no mechanical contact takes place. The bearings of the motor, compressor and the expanders may be lubricated by a circulating mist as described above. Magnetic coupling plates 114 and 116 operate through thin wall 118 so that power is interchanged between compressor 108 and expander 120. Expander 120 has rotors 122 and 124 which are preferably separated by the hydrodynamic gas film. Expander 120 is coupled to expander 126 by means of magnetic coupling plates 128 and 130 which operate through wall 132. Expander rotors 134 and 136 expand gas in the chambers defined by the lobes and recesses on the rotors and again the rotor 136 is preferably separated from rotor 134 by a hydrodynamic gas film so that no mechanical connection is necessary. All bearings are preferably lubricated by mist lubrication in order to provide a long life, and the mist lubrication circuits are defined in such a manner that bearings at the same pressure are connected together on the same mist lubrication circuit and the bearings at different pressure are on separate mist lubrication circuits.

Figure 5:
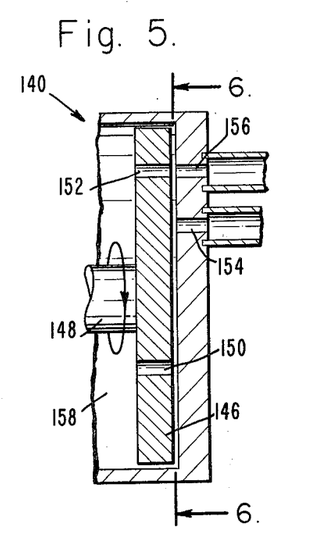
FIG. 5 is a longitudinal section through a valve suitable for flow reversing.
Figure 6:
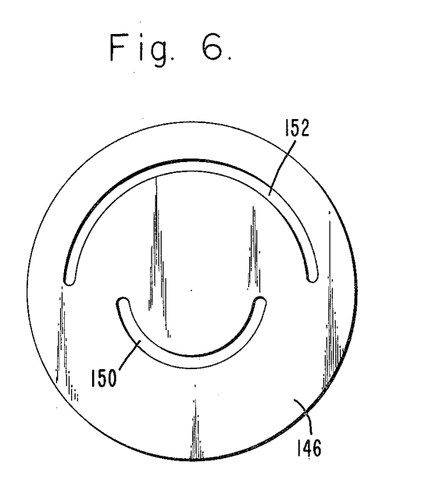
FIG. 6 is an elevational view of the valve face, as seen generally along the line 6—6 of FIG. 5.

The cryogenic system could be arranged with the compressor 108 and expanders 120 and 126 to provide two temperature levels of refrigeration by employing suitable counterflow heat exchanges between the various flow streams. However, the screw compressor-expander cryogenic refrigeration system illustrated in FIG. 4 is equipped with valves to permit its use with regenerator systems. Valve structure 140 is illustrative of valve structures 142 and 144 which are of similar design, with the details of valve structure 140 illustrated in FIGS. 5 and 6. Valve disc 146 is rotated by shaft 148 which is the shaft of rotor 124. Openings 150 and 152 are formed through disc 146 and are illustrated as being approximately half circular. They are positioned to cover and uncover valve ports 154 and 156 respectively. When cyrogenic gas under pressure is provided in chamber 158 then the gas is alternately ported to the lines connected to valve ports 154 and 156. The configuration of openings 150 and 152 depends on the gas, the rotative speed and the pressure, and the ports may be overlapped or underlapped depending on particular conditions. As illustrated in FIG. 6, they are slightly underlapped.

The ports 154 and 156 with their corresponding openings are in effect separate valves which open at approximately opposite times. For convenience in the schematic diagram of FIG. 7 wherein the system incorporating regenerators as generally indicated at 160, for the convenience of schematic showing, the valving is separately shown. Similar valve ports 162 and 164 are shown in connection with compressor 108 and valve ports 166 and 168 are shown in connection with expander 126. As the compressor and expanders rotate the valves open and close to reverse flow in much of the system 160.

Figure 7:
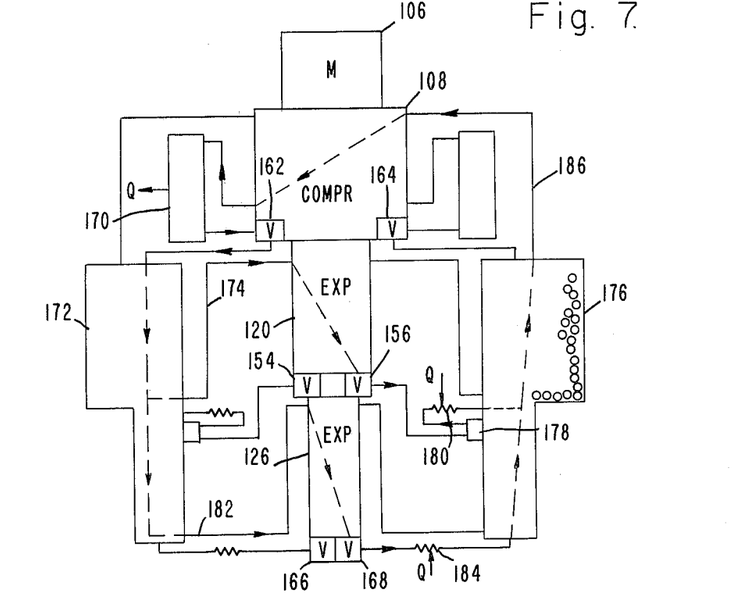
FIG. 7 is a schematic flow diagram showing the screw compressor-expander cryogenic system with two expander stages and with heat exhange regenerators.

In FIG. 7 flow arrows are shown in connection with one position of the valving, and it is understood that with a half turn of the valve discs, some of the flows are reversed. The direction of flow and the reversing flow will be discussed in connection with the following description of the schematic of FIG. 7 of the system 160. In considering the system, the flow arrows shown in FIG. 7 are for one portion of the flow cycle. In accordance with the usual regenerator practice, the valves are alternately operable so that flow direction through the regenerators reverses from time to time. At the time illustrated, compressor 108 takes suction of refrigerant gas, compresses the gas and delivers it through heat exchanger 170 where heat is rejected to the ambient. Gas flow passes through open valve 162 and downward into the top of regenerator 172 which is about 300° K. The down flowing gas is cooled by the previously cooled regenerator packing. Part of the downward flow is taken out through line 174 where it enters expander 120 and is expanded therein. The expanded gas passes out through open valve 156 and is in surface heat exchange with the body of regenerator 176 at heat exchanger 178. This heat exchange is to stabilize the temperature. From heat exchanger 178, the fluid flow passes through heat exchanger 180 which provides refrigeration load at about 80° K. From the heat exchanger load, the fluid passes into regenerator 176 to rise therein.

Another portion of the downflowing cryogenic refrigerator gas stream in regenerator 172 is taken out of the regenerator at line 182 where it passes into the high pressure end of the second stage expander 126. After it is expanded therein it passes out through valve 168 and then through load heat exchanger 184 which is at about 40° K. From load heat exchanger the cryogenic refrigerant gas is delivered to the bottom of regenerator 176 and it is moved upwardly therethrough joining the stream from load heat exchanger 180 to absorb heat from the regenerator packing. At the top of the regenerator the cryogenic fluid passes through line 186 and back to the suction of compressor 108.

At the next portion of the cycle, the valves 162, 156 and 168 close while the valves 164, 154 and 166 open to reverse the flow through the regenerators. By using a regenerator system, rather than a counterflow heat exchanger system, greater refrigeration efficiencies can be achieved.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A closed cycle refrigeration system comprising:
a screw compressor having a housing with a compressor chamber therein, said housing having inlet and outlet ends, an inlet and an outlet adjacent the ends of the said housing;
first and second helical rotors rotatably mounted within said housing, said first and second helical rotors respectively having intermeshing lobes and recesses configured and fitted so that compression occurs in oil-free refringerant gas passing through said compressor;
an expander having an expander housing with an expander chamber therein, said expander housing having inlet and outlet ends, an inlet adjacent one end of said expander housing and an outlet on the outlet end of said expander housing;
first and second helical expander rotors rotatably mounted within said expander housing, said first and second helical expander rotors respectively having intermeshing lobes and recesses configured and fitted so that gas expansion takes place between said lobes and within said recesses in oil-free refrigerant gas upon rotation of said expander rotors in said expander housing;
means interconnecting said inlet and outlet on said compressor housing and said inlet and said outlet on said expander housing for providing a closed cycle for the circulation of oil-free refrigerant gas therein, for rejecting heat, and for receiving heat for producing refrigeration upon rotation of said rotors; and
a wall between said compressor housing and said expander housing, magnetic drive means connected to rotate with one of said compressor rotors and magnetic drive means connected to rotate with one of said expander rotors for magnetically coupling said rotors to transfer power therebetween as they rotate.

2. The refrigerator system of claim 1 wherein a motor is connected to one of said compressor rotors to drive said compressor and the other of said compressor rotors is driven only by said motor driven rotor.

3. A refrigerator system comprising:
a compressor housing having a chamber therein, first and second interengaging helical compressor rotors in said compressor housing chamber arranged so that rotation of said rotors causes oil-free gas compression in said compressor housing chamber;
motor means connected to said first compressor rotor for driving said first compressor rotor;
an expander housing having an expander chamber therein, first and second helical expander rotors rotatably mounted in said expander chamber and interengaging so that as said rotors rotate, oil-free gas is expanded in said expander chamber to produce refrigeration;
a wall between said compressor chamber and said expander chamber, first magnetic means positioned on one side of said wall and connected to rotate with one of said helical compressor rotors and magnetic means on the other side of said wall and magnetically coupled with said first magnetic means and connected to rotate with one of said helical expander rotors for transmitting power between said compressor rotor and expander rotor and for controlling the speed of said expander rotor; and
means interconnecting between said compressor chamber and said expander chamber and between a heat load and means for circulating oil-free refrigerant gas and for rejecting heat for providing refrigeration to said heat load.

4. The refrigeration system of claim 3 wherein said motor means is connected to drive one of said compressor rotors and said magnetic means is connected between said motor driven compressor rotor and one of said expander rotors.

5. The refrigeration system of claim 4 wherein the other of said expander rotors is driven only by said rotor connected to said magnetic coupling.

6. The refrigerator of claim 5 wherein the other of said compressor rotors is driven only by said motor driven compressor rotor.

7. The refrigeration of claim 4 wherein the other of said compressor rotors is driven only by said motor driven compressor rotor.

8. A closed cycle refrigeration system comprising:

a screw compressor having a housing with a compressor chamber therein, first and second helical compressor rotors rotatably mounted within said housing, said first and second helical compressor rotors having intermeshing lobes and recesses configured so that compression occurs in oil-free refrigerant gas passing through said compressor, an inlet and an outlet connected to said compressor chamber;

first and second expanders connected to said compressor to exchange energy between said compressor and said expanders, each of said expanders having a housing with an expander chamber therein, each of said expanders having first and second helical expander rotors rotatably mounted within their respective housing, said first and second helical expander rotors having intermeshing lobes and recesses configured so that expansion occurs in oil-free refrigerant gas passing through said expanders, an inlet and an outlet connected to said expander chamber of each of said expanders;

means connecting said inlet and outlet on said compressor housing and said inlets and outlets on said expanders for providing a closed cycle for the circulation of oil-free refrigerant gas therein, for rejecting heat and for receiving heat for producing refrigeration upon rotation of said rotors.

9. The closed cycle refrigeration system of claim 8 wherein there is a wall between each of said housings and a magnetic coupling across said walls so that said expanders are magnetically coupled to rotate with said compressor to transfer energy therebetween as they rotate.

10. The closed cycle refrigeration system of claim 9 wherein said system includes motor means to drive one of said compressor rotors and the other of said compressor rotors is driven only by said motor driven compressor rotor.

11. The closed cycle refrigeration system of claim 8 wherein said system includes motor means to drive one of said compressor rotors and the other of said compressor rotors is driven only by said motor driven compressor rotor.

12. The cryogenic refrigerator system of claim 10 wherein only one of said expander rotors is connected to said magnetic coupling to rotate with said compressor rotor and the other of said expander rotors is driven only by said rotor connected to said magnetic coupling.

13. The cryogenic refrigerator system of claim 8 wherein only one of said expander rotors is connected to said magnetic coupling to rotate with said compressor rotor and the other of said expander rotors is driven only by said rotor connected to said magnetic coupling.

14. The cryogenic refrigerator system of claim 8 wherein said system includes reversing flow regenerators.

15. The cryogenic refrigerator of claim 14 further including valves in said system for controlling fluid flow to and from said compressor and said expanders, said valves controlling a reversing flow to said regenerators for heat exchange with the refrigerant gas and production of refrigeration.

16. A cryogenic refrigerator system comprising:

a compressor housing having a chamber therein, first and second interengaging helical compressor rotors rotatably mounted in said compressor chamber and arranged so that rotation of said helical compressor rotors causes compression in oil-free refrigerant gas in said compressor chamber;

an expander housing having an expander chamber therein, first and second helical expander rotors rotatably mounted in said expander chamber and interengaging so that as said expander rotors rotate, oil-free refrigerant gas is expanded in said expander chamber;

motor means connected to said first compressor rotor for driving said first compressor rotor;

connection means connecting one of said compressor rotors and said first expander rotor for exchanging energy between said expander and said compressor; and a cryogenic system interconnecting said compressor and said expander chambers and further including a regenerator, valve means, heat rejection means and heat receptor means for circulating oil-free refrigerant gas for producing refrigeration at said heat receptor means and rejecting heat to ambient at said heat rejection means when said compressor and said expander rotate and said valves are operated.

17. The cryogenic refrigerator system of claim 16 wherein there are first and second expanders and each of said first and second expanders is connected to expand gas in said cryogenic refrigeration system and each of said first and second expanders is connected to a regenerator.

* * * * *